United States Patent

[11] 3,585,293

[72] Inventor Norman Allison Crowder
Wilmette, Ill.
[21] Appl. No. 792,408
[22] Filed Jan. 21, 1969
[45] Patented June 15, 1971
[73] Assignee Columbia Broadcasting System, Inc.
New York, N.Y.

[54] SCANNING OF CINEMATOGRAPH FILM
10 Claims, 10 Drawing Figs.

[52] U.S. Cl. .......... 178/7.2, 178/6.7
[51] Int. Cl. .......... H04n 5/86
[50] Field of Search .......... 178/7.2, 6.7 A, 69.5, 5.4 CR; 179/100.3 A,D

[56] References Cited
UNITED STATES PATENTS
3,402,260 9/1968 Goldmark et al. .......... 178/7.2 D

*Primary Examiner*—Richard Murray
*Assistant Examiner*—John C. Martin
*Attorney*—Brumbaugh, Graves, Donohue & Raymond

ABSTRACT: A continuously moving film has recorded thereon a succession of frames and a timing track adapted when scanned to produce a timing signal periodically varying at a frequency in fixed relation to the horizontal line scanning frequency and of one phase during part of each frame scan and of the opposite phase during a succeeding part of the frame scan. The timing signal is converted to a signal at the line scanning rate which is used to synchronize a line scan signal generator and from which is derived a reference signal at the timing signal frequency and of fixed phase. A comparator compares the timing signal with the reference signal and, when the two are in phase, provides a signal to enable a first gate to pass a synchronizing signal from a counter to a vertical or frame scanning generator to synchronize the same. The synchronizing signal also initiates a flip-flop which disables the first gate and jointly with the comparator enables a second gate a predetermined number of scanning lines after occurrence of the synchronizing signal to pass a signal from the counter to reverse the phase of the reference signal.

Figure 1:
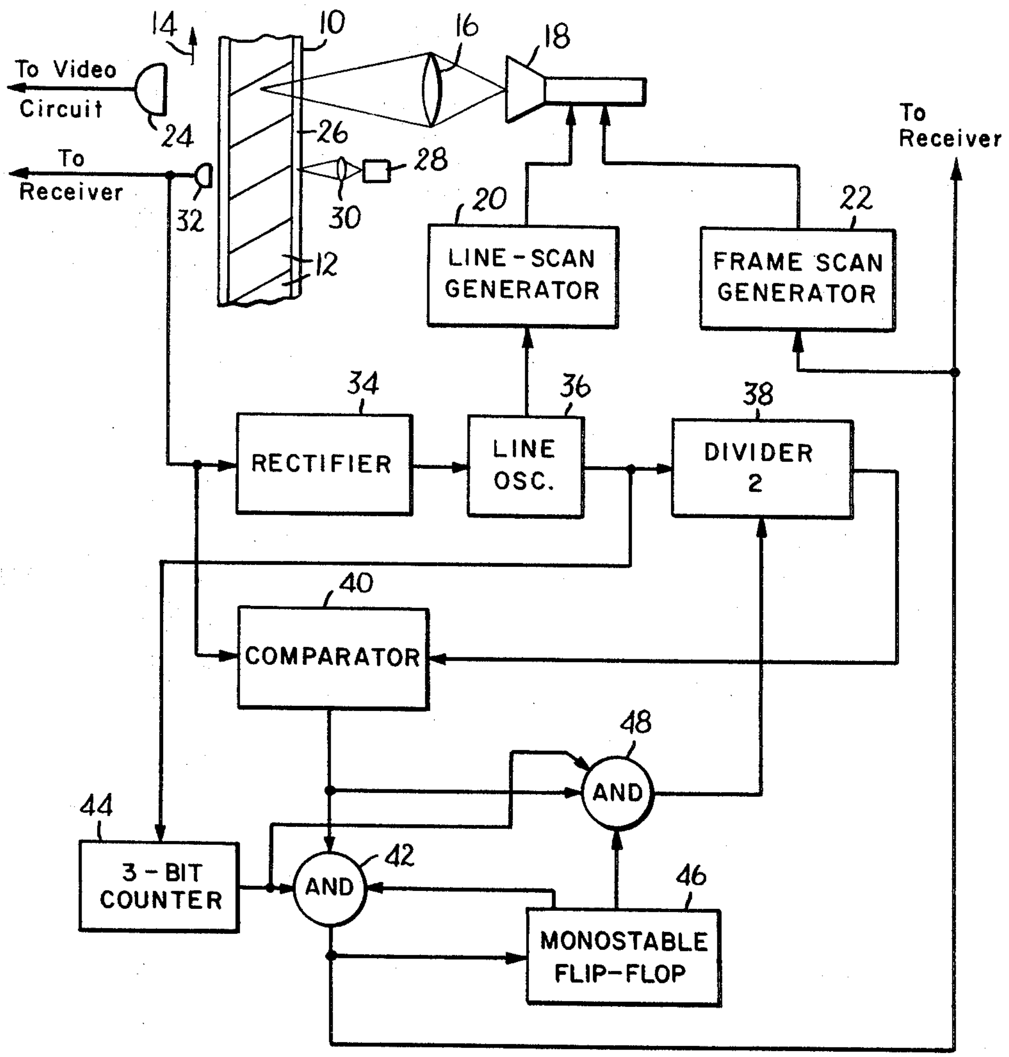
Figures 1A, 1B:
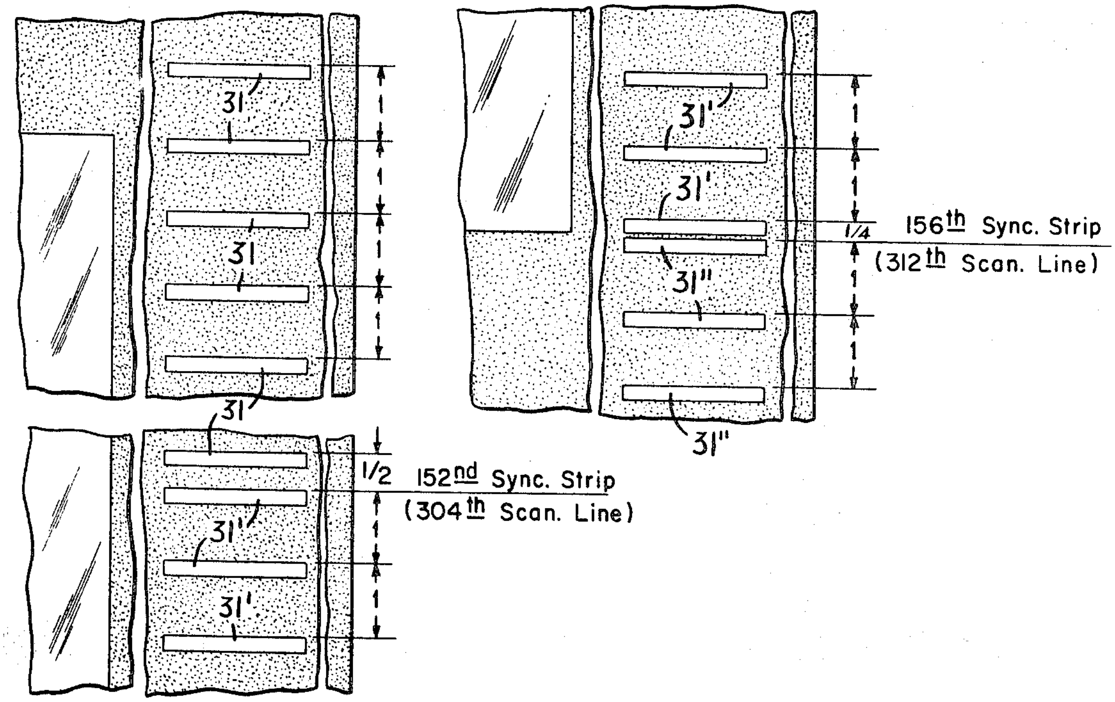

For interlaced scan, there is recorded in the timing track a signal which effects a half line (90°) delay in the timing signal at the beginning of each film frame.

INVENTOR.
NORMAN ALLISON CROWDER
BY
Brumbaugh, Graves, Donohue & Raymond
his ATTORNEYS INVENTOR.
NORMAN ALLISON CROWDER
BY
Brumbaugh, Graves, Donohue & Raymond
his ATTORNEYS INVENTOR.
NORMAN ALLISON CROWDER
BY
Brumbaugh, Graves, Donohue & Raymond
his ATTORNEYS

SCANNING OF CINEMATOGRAPH FILM

This invention relates to the frame-by-frame scanning of a continuously moving cinematograph film by means of a flying spot scanner. A video signal can thus be derived for reproducing the film on a domestic television receiver for example. The frame scan of the scanning raster can be in the same direction as the direction of film movement. The frame scan speed can either be double that of the film speed or half that of the film speed, the latter as described in the specification of the applicant's copending application Ser. No. 792,409, filed Jan. 21, 1969, for "Improvements in or Relating to Flying Spot Scanners." In either event some means of synchronizing the film movement and the scanner time bases is required and this is conveniently achieved by providing a time base track along the film, e.g., an optical or magnetic track, and deriving synchronizing pulses therefrom to control the scanner time bases.

Apparatus of this general character has been proposed in which frame synchronizing pulses are derived from frame synchronizing indicia in the time base track, the horizontal line scan being controlled by a free-running oscillator at the horizontal line scan frequency. Although interlaced scans are not utilized, such systems have been found quite effective in operation.

This application is addressed to equipment of this character in which the synchronizing indicia in the time base track are adapted when scanned to provide synchronizing signals of relatively high frequency, e.g., half the horizontal line frequency. From these synchronizing signals are derived both line and frame synchronizing signals and the object of this invention is to provide an improved system for doing this and having a number of advantages discussed below, in particular its ready adaptation to an interlaced television system.

According to the invention, there is provided video film reproducing apparatus comprising means for moving cinematograph film continuously through a scanning gate, a flying spot scanner arranged to scan the film at the gate with a periodic raster of lines, and means for deriving a first periodic signal from a timing track on the film at a frequency equal to or a submultiple of the line frequency, a flywheel oscillator synchronized to and running at an even multiple of the frequency of the first periodic signal, a dividing circuit arranged to derive from the oscillator a second periodic signal of the same frequency as the first periodic signal, a counter arranged to count cyclically an integral number of pulses from the oscillator and means arranged so to compare the first and second periodic signals as to provide a frame pulse at a predetermined instant in the cycle of the counter the first time that this instant occurs after a phase change of 180° of the first periodic signal relative to the second periodic signal has occurred.

Further, according to the invention, there is provided cinematograph film for use with apparatus according to the invention, characterized by a succession of picture frames adjacent a continuous timing track which has recorded therealong $n \times m$ signals per frame where $n$ and $m$ are integers, the signals being recorded with a uniform spacing except between the $(n-1).m^{th}$ signal and the $[(n-1).m+1^{th}$ signal where the spacing corresponds to a 180° phase shift in the periodic signal obtained by reproduction from the time base track at a constant film speed. In addition, the signals recorded in the timing track may be spaced to shift the phase of the periodic signal by 90° at the end of each frame scan to provide for interlaced scanning.

Figure 3:
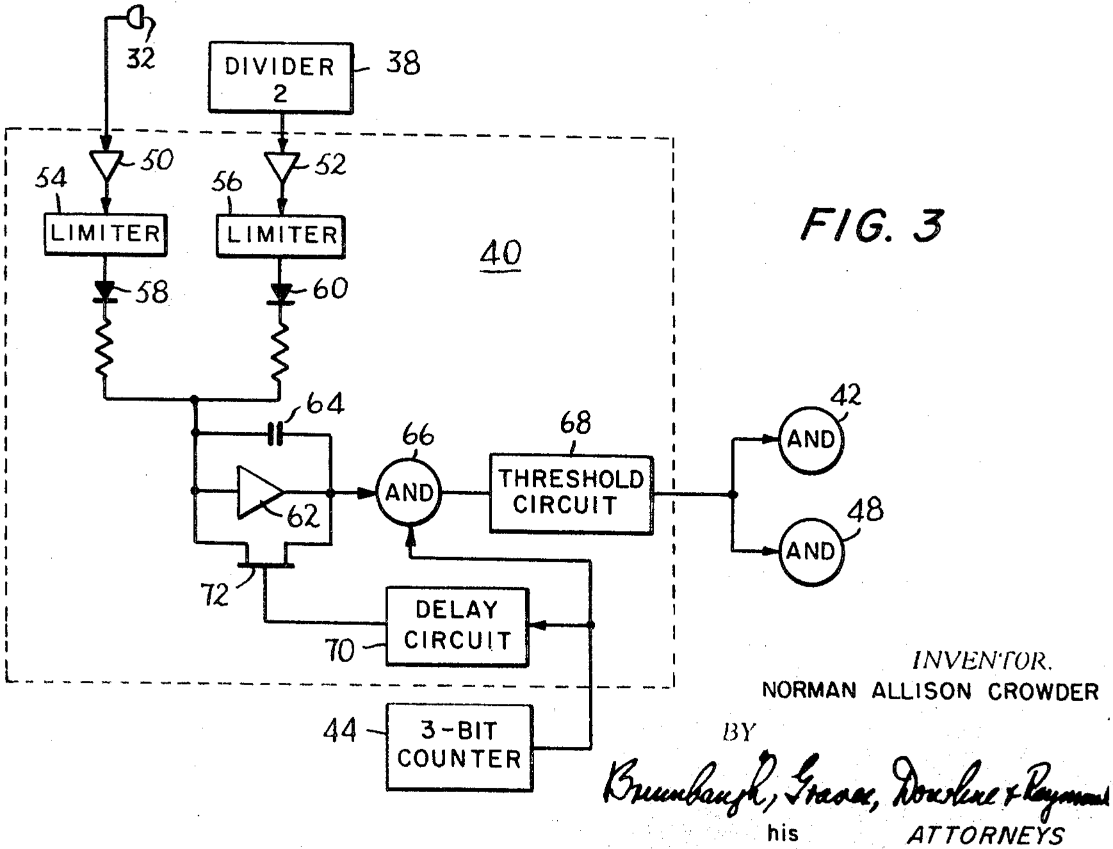
Figures 2A, 2B, 2C, 2D, 2E, 2F:
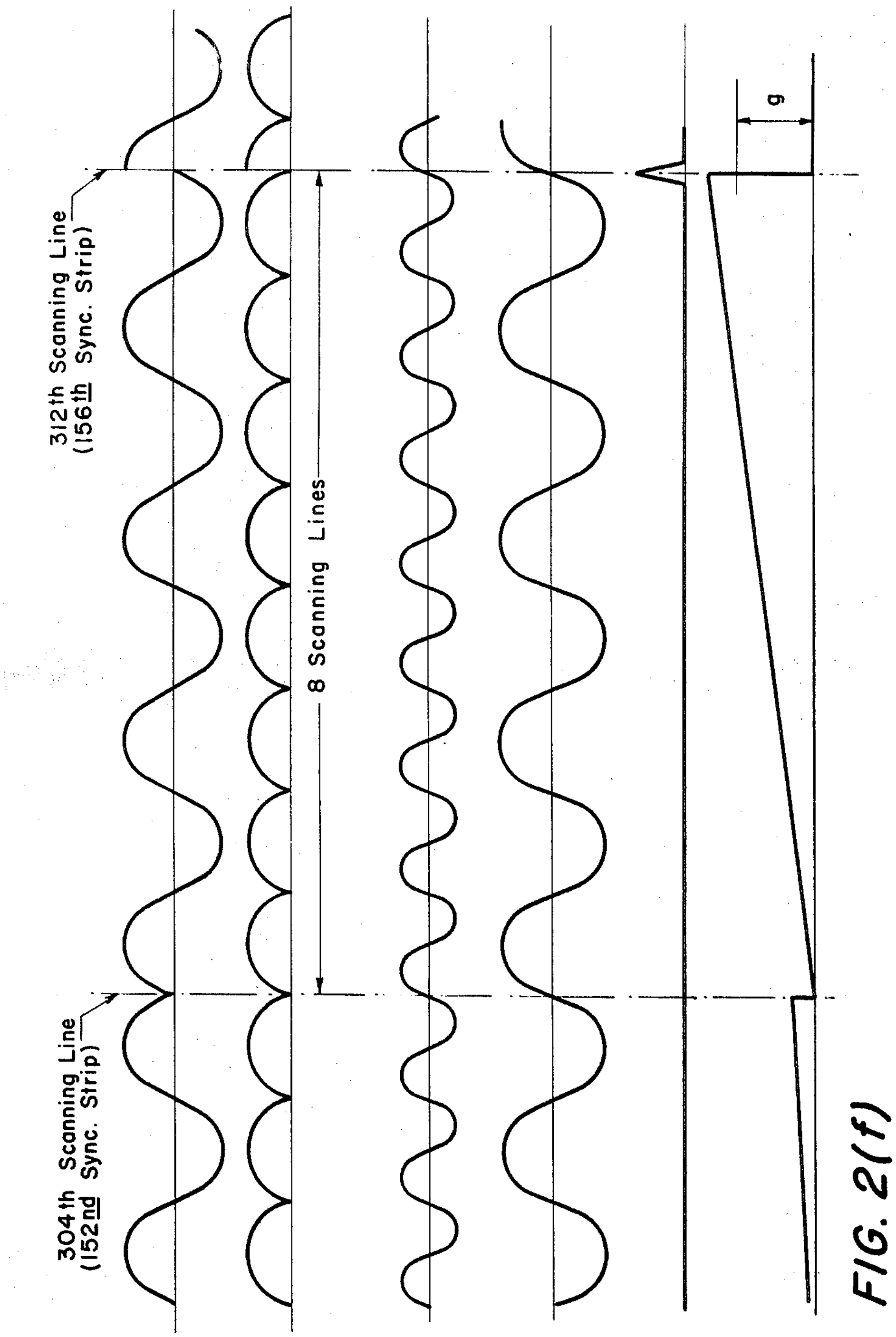

The invention will be described in more detail, by way of example, with reference to the accompanying drawings, in which:

FIG. 1 is a block diagram of apparatus embodying the invention;

FIG. 1(*a*) is a view of a piece of film made according to the invention, showing one way of spacing the signals recorded in the timing track to correspond to a phase shift of 180°;

FIG. 1(*b*) is a view of a piece of film showing how the spacing between the signals recorded in the timing track may be selected to produce a 90° phase shift at the end of each frame;

FIGS. 2(*a*), 2(*b*), 2(*c*), 2(*d*), 2(*e*) and 2(*f*) show explanatory waveforms; and FIG. 3 shows part of FIG. 1 in more detail.

In the specific embodiment of the invention described below for purposes of illustration, it is assumed that the film to be reproduced is to be run at a speed such that the frame rate is the same as the raster scanning field rate, and that each scanning field contains one-half the total number of lines in one image frame. Thus, in the case of European 625-line standards, the film frame rate will be 50 frames per second corresponding to a scanning field rate of 50 fields per second, and each scanning field will contain 312 lines.

In FIG. 1, a film 10 having a succession of frames 12 thereon is moved at a steady speed of say, 50 frames per second in the direction of the arrow 14. The frames 12 are scanned by a raster projected through a lens 16 from a conventional flying spot scanner 18 having line and frame scanning signal generators 20 and 22 adapted to operate at frequencies of 15,600 Hertz and 50 Hertz, respectively. Light transmitted by the film 10 is detected by a photomultiplier tube 24 whose output may be fed to video circuits as in a television receiver (not shown), for example.

A synchronizing signal is derived by a sensor 32 such as a phototransistor which picks up light transmitted by a timing track 26 recorded along one edge of the film. The track 26 is illuminated by light directed from a lamp 28 through a lens 30 and is an opaque track with narrow transparent strips 31 (FIG. 1(*a*)) at a spacing corresponding to half the line scanning frequency. In a practical case, assuming that European 625-line standards apply, the track 26 might have 156 strips 31 per frame so that with the film 10 in continuous motion at 50 frames per second, a timing signal of a frequency of 7,800 Hertz (one-half the usual line scanning rate), represented by the waveform shown in FIG. 2(*a*), is generated by the sensor 32.

Initiation of the frame synchronizing signal according to the invention, requires a phase reversal of the timing signal at a predetermined time during each frame scan. To this end, the last few strips 31' towards the bottom of each frame are spaced from the preceding ones by a distance corresponding to a phase shift of 180°. Thus, the spacing between the last strip 31 and the adjacent strip 31', may be one-half the spacing between the strips 31. The strips 31', of course, are spaced apart the same distance as the strips 31. For a reason to be given later, the first strip 31' is preferably the 152nd from the top of the frame, corresponding to the 304th horizontal scanning line. The phase reversal produced when the 152nd strip is scanned is shown in FIG. 2(*a*).

The 7800-Hertz timing signal from the sensor 32 (FIG. 2(*a*)) is subjected to full wave rectification in the rectifier 34, the output from which, represented by the waveform FIG. 2(*b*), is used to synchronize an oscillator 36 connected to the horizontal line scan signal generator 20. The signal output of the oscillator 36, represented by the waveform FIG. 2(*c*), thus is at twice the frequency of the timing signal (15,600 Hertz). The oscillator 36 also supplies an input to a divide-by-two frequency divider 38 which provides a reference signal input, represented by the waveform FIG. 2(*d*), at half the frequency of the oscillator 36 to a comparator 40 which also receives the timing signal from the sensor 32 as a second input. Up to the 304th scanning line in each frame (see FIGS. 2(*a*) and 2(*d*)), the timing signal and the output of the divider 38 are out of phase, so that there is no output from the comparator 40.

At the 304th scanning line (the first strip 31' in FIG. 1(*a*)) the phase of the timing signal (FIG. 2(*a*)) is shifted 180°. However, this phase change is entirely without effect upon the signals shown at FIGS. 2(*b*) and 2(*c*) and hence, upon the phase of the reference signal (FIG. 2(*d*)). Accordingly, the comparator now has an output which enables an AND gate 42 to pass the next output pulse from a 3-bit counter 44 to the frame scan signal generator as a frame synchronizing signal therefor.

The counter 44 is connected to count pulses from the oscillator 36 and to generate an output pulse each time eight input pulses are registered. Since the gate 42 is disabled up to the 304th scanning line, the counter 44 is ineffective up to this point. After the 304th scanning line, however, the gate 42 is enabled by the comparator 40 so that the next output pulse from the counter 44 (which occurs at the 312th scanning line) is passed as a frame synchronizing pulse (FIG. 2(*e*)) to the frame scan signal generator 22.

Following the frame pulse (FIG. 2(*e*)), the next 24 scanning lines (three groups of eight) are kept free for the flyback interval. To this end, the frame pulse (FIG. 2(*e*)) sets a monostable flip-flop 46 having a period a little in excess of 24 line periods which disables the AND gate 42 and enables an AND gate 48. The gate 48 will thus provide an output pulse if, at any of the 8th 16th and 24th lines of the scan thereafter, the timing signal (FIG. 2(*a*)) from the timing track 26 and the half line-frequency signal (FIG. 2(*d*)) are in phase. A pulse so provided is applied to the divide-by-two circuit 38 to shift the phase of the reference signal (FIG. 2(*d*)) by 180°, thus achieving the desired condition of out of phase inputs to the comparator 40 which prevails until the 304th scanning line of the new raster.

A particular advantage of the apparatus described above is that it will, without further modification, deal with an interlaced scan. To accomplish this result, it is merely necessary to introduce a 90° phase shift in the timing signal (FIG. 2(*a*)) at the 312th scanning line. This 90° phase shift, like the previously described 180° phase shift is obtained simply by varying the otherwise uniform spacing of the signals recorded on the timing track 26. Specifically, the spacing between the 155th synchronizing strip 31' and the next succeeding strip 31'' should be reduced to one-fourth of the spacing between adjacent strips 31', the spacing between the strips 31'' being the same as that between the strips 31'. The 24-line flyback period is adequate for the oscillator 36 to pull into its new phase and for the reference signal (FIG. 2(*d*)) to be shifted by 180° as described above, if it happens to settle initially in the wrong phase.

Another advantage is that, if a color system is used as described in the above-mentioned specification, for example, and it is required to put the color information on an RF subcarrier, the line frequency is available for generating this subcarrier.

One form which the comparison circuit can take is illustrated in FIG. 3. The timing signal (FIG. 2(*a*)) and the reference signal (FIG. 2(*d*)) are amplified by the amplifiers 50 and 52, respectively, and limited by the limiters 54 and 56, respectively, to achieve signals of equal amplitude which are rectified by the diodes 58 and 60, respectively, and added by a summing amplifier 62 having a feedback capacitor 64. The amplifier 62 thus integrates the sum of the reference and timing signals and, when they are out of phase only small noise signals are integrated and the integrated signal is only small after eight lines. However, when the timing and reference signals are in phase, a large integrated signal builds up.

In this embodiment, the output of the 3-bit counter 44 may be connected to an AND gate 66 adapted to be enabled by the output of the integrator 62 to provide enabling outputs to the AND gates 42 and 48 through a threshold circuit 68. The threshold circuit 68 is designed to discriminate between the integral of noise only and the integral of the timing signal and the reference signal (FIG. 2(*d*)) in phase and, in the latter instance passes the comparator output to the gates 44 and 48.

In order to prevent the integral of noise signals building up too much over a large number of lines, the integrator 62 is cleared after the gate 66 has opened to sample the integrator output. To this end, the pulse from the counter 44 is delayed slightly by a circuit 70 and applied to a switching transistor 72 to short out the integrator 62. Alternatively, the integrator can be arranged to leak with a suitable time constant.

The output of the integrator 62 is shown in FIG. 2(*f*). At the 304th scanning line (when the gate 66 opens) the integrator output (FIG. 2(*f*)) has built up only to a small level. However, at the 312th scanning line (when the gate 66 next opens) the integrator output has built up to a much larger level exceeding the threshold *g* established by the circuit 68.

The line frequency signal is derived with much greater accuracy than can a single frame synchronizing signal because the signal to noise ratio of the signal derived from the timing track 26 is improved by a factor of $\sqrt{312}$. The line pulse counting technique ensures that the frame pulse is derived with comparable accuracy and yet the technique of marking the impending end of the frame by the phase jump of the reference signal (FIG. 2(*d*)) enables only a small capacity counter to be used.

In the embodiment described, the track 26 produces half line frequency pulses which is the highest frequency which can be handled when working with a small frame near the limits of optical resolution on the film. With a magnetic time base track, however, there is no reason why line frequency pulses should not be used with the oscillator 36 running at the conventional twice line frequency.

I claim:

1. Apparatus for reproducing film having recorded thereon a succession of frames and a timing track in relation to said frames, comprising

- means for moving said film continuously past a scanning zone;
- means for scanning said film frames at said scanning zone by a raster of lines having predetermined line scan and frame scan rates;
- means for scanning said timing track to generate a timing signal varying periodically at a frequency which is one-half the line scan rate;
- means for converting said timing signal to a line scan control signal varying periodically at said line scan rate; and
- means responsive to said line scan control signal for controlling the line scan rate of said film scanning means.

2. Cinematograph film for use with apparatus for producing a signal representative of the film information content by scanning the film frames with a raster of lines and responsive to timing indicia on the film to synchronize operation of the scanning apparatus with the film, the film including a succession of picture frames, and an adjacent continuous time base track which has recorded therealong $n \times m$ signals per frame where $n$ and $m$ are integers, the signals being recorded almost entirely with a uniform spacing therebetween, the spacing between the $(n-1).m^{th}$ signal and the $(n-1).m+1^{th}$ signal differing from said uniform spacing and corresponding to a 180° phase shift in the periodic signal obtained by reproduction from the time base track at a constant film speed.

3. Cinematograph film according to claim 2, wherein the spacing between the $n.m^{th}$ signal of one frame and the first signal of the next frame corresponds to a 90° phase shift in the periodic signal obtained by reproduction from the time base track at a constant film speed.

4. Film reproducing apparatus for reproducing film having recorded thereon a succession of frames and a timing track in relation to said frames, comprising

- means for moving said film continuously past a scanning zone;
- means for scanning said film frames at said scanning zone by a raster of lines having predetermined line scan and frame scan rates;
- means for scanning said timing track to generate a timing signal varying periodically at a frequency in known relation to said line scan rate;
- means for converting said timing signal to a signal varying periodically at said line scan rate;
- means responsive to said last-named signal for deriving therefrom a reference signal varying periodically at the frequency of said timing signal;
- comparator means connected to receive said timing signal and said reference signal and responsive to a change of phase of one with respect to the other for enabling generation of a frame scan control signal; and
- means responsive to said frame scan control signal for controlling the frame scan rate of said raster.

5. Film reproducing apparatus as defined in claim 4, together with means for counting periodic variations in said line scan control signal and generating an output signal each time an integral number of such variations is counted, the comparator means connected to receive the timing signal and the reference signal being adapted to select as a frame control signal a predetermined output signal generated by said counter after said change of phase.

6. Film reproducing apparatus as defined in claim 5, in which the frequency of said line scan control signal is twice the frequency of said timing signal.

7. Film reproducing apparatus as defined in claim 5, in which the timing signal converter means comprises full-wave rectifier means and oscillator means synchronized by the output of said rectifier means, the reference signal deriving means is a frequency divider connected to receive an input from said oscillator means, and the comparator means includes threshold means for discriminating between spurious signals and output signals resulting from a change in phase between the timing signal and the reference signal.

8. Film reproducing apparatus as defined in claim 5, in which said integral number of periodic variations in the line scan control signal is a submultiple of the number of lines in a frame.

9. Film reproducing apparatus as defined in claim 5, together with means jointly responsive to outputs from said counting means and said comparator means and operative in an interval following each frame pulse for shifting the phase of said reference signal to restore the phase relation originally prevailing between the timing signal and the reference signal for which there is no output from the comparator means.

10. Film reproducing apparatus for reproducing film having recorded thereon a succession of frames and a timing track in relation to said frames, comprising means for moving said film continuously past a scanning zone;

means for scanning said film frames at said scanning zone by a raster of lines having predetermined line scan and frame scan rates;

means for scanning said timing track to generate a timing signal therein periodically at a frequency in known relation to said line scan rate;

means for converting said timing signal to a line scan control signal varying periodically at said line scan rate;

means responsive to said line scan control signal for controlling the line scan rate of said film frame scanning means;

means responsive to said line scan control signal for deriving therefrom a reference signal varying periodically at the frequency of said timing signal;

comparator means connected to receive said timing signal and said reference signal and responsive to a change in phase of one with respect to the other for enabling generation of a frame scan control signal; and means responsive to said frame scan control signal for controlling the frame scan rate of said raster.